United States Patent
Takano

(10) Patent No.: US 6,256,453 B1
(45) Date of Patent: Jul. 3, 2001

(54) DISK RECORDING APPARATUS AND VIDEO CAMERA USING THE SAME

(75) Inventor: Yoshiaki Takano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/925,922

(22) Filed: Sep. 9, 1997

(30) Foreign Application Priority Data

Sep. 10, 1996 (JP) .................................................. 8-238848
Jan. 23, 1997 (JP) .................................................. 9-010562

(51) Int. Cl.$^7$ .................................................. H04N 5/781

(52) U.S. Cl. ........................................ 386/126; 369/53.24

(58) Field of Search .................................. 386/1, 45, 95, 386/125–126, 70; 360/27; 369/47–50, 59, 32, 53.24

(56) References Cited

U.S. PATENT DOCUMENTS

| | | | |
|---|---|---|---|
| 2,920,045 | 1/1960 | Hearn et al. .......................... | 252/137 |
| 3,089,848 | 5/1963 | Morway ................................ | 252/18 |
| 3,882,247 | 5/1975 | Bullock ................................ | 424/337 |
| 3,960,742 | 6/1976 | Leonard ................................ | 252/90 |
| 3,984,463 | 10/1976 | Pilgram ............................ | 260/501.17 |
| 4,183,741 | 1/1980 | West et al. .............................. | 71/92 |
| 4,227,911 | 10/1980 | Leonard et al. .......................... | 71/77 |
| 4,265,406 | 5/1981 | Palgrave et al. ........................ | 241/16 |
| 4,272,414 | 6/1981 | Vandersall ............................ | 252/602 |
| 4,294,633 | 10/1981 | Clay ........................................ | 149/2 |
| 4,331,490 | 5/1982 | Palgrave et al. ........................ | 149/46 |
| 4,372,777 | 2/1983 | Le Clair et al. .......................... | 71/93 |
| 4,393,151 | 7/1983 | Dawans et al. ........................ | 523/130 |
| 4,407,707 | 10/1983 | Merchant et al. ...................... | 204/90 |
| 4,482,372 | 11/1984 | Palgrave et al. .......................... | 71/35 |
| 4,673,526 | 6/1987 | Zabotto et al. ................. | 252/174.16 |
| 4,784,788 | 11/1988 | Lancz .................................. | 252/114 |
| 4,816,312 | 3/1989 | Annemaier et al. .................... | 423/74 |

(List continued on next page.)

FOREIGN PATENT DOCUMENTS

| | | |
|---|---|---|
| 0 584 991 | 3/1994 | (EP) . |
| 0 709 843 | 5/1996 | (EP) . |
| 0 713 334 | 5/1996 | (EP) . |
| WO 96 26600 | 8/1996 | (WO) . |

OTHER PUBLICATIONS

Fasciano, P.: "Camcutter—Pictures Direct From Lens To Disk", Imag Technology (Journal of The BKSTS), vol. 78, No. 9, Oct. 1, 1996, pp. 16–18, 20, XP000628350.

* cited by examiner

Primary Examiner—Wendy R. Garber
Assistant Examiner—Christopher Onuaku
(74) Attorney, Agent, or Firm—Frommer Lawrence & Haug, LLP.; William S. Frommer; Dexter T. Chang

(57) ABSTRACT

A video camera using a disk-type recording medium is capable of allowing the user to extend the remaining record time easily. In the control sequence, step 2 detects whether the record time extension key is pressed. The sequence proceeds to step 3 if the key is pressed, or otherwise proceeds to step 5. Step 3 calculates the extendable remaining record time and displays it. When the storage space runs out during the recording of the video signal of an intended shot scene, step 4 searches for the largest record area or nearest record area of NG scene based on management information which is recorded on the recording medium for the video signal of each shot scene, moves the recording head to the area, and records the video signal of intended scene continuously by overwriting in the area. Step 5 detects whether the record time remains. The sequence proceeds to step 6 to terminate the recording operation if the record time runs out, or otherwise returns to step 2. Management information including record positions of video signals is stored temporarily in the memory, and it is recorded in the management information area of the recording medium when the recording is halted or terminated.

16 Claims, 6 Drawing Sheets

U.S. PATENT DOCUMENTS

| | | | |
|---|---|---|---|
| 4,824,475 | 4/1989 | Markley et al. | 71/93 |
| 4,876,354 | 10/1989 | Siegel et al. | 548/341 |
| 4,918,085 | 4/1990 | D'Silva et al. | 514/407 |
| 4,943,307 | 7/1990 | Detre et al. | 71/3 |
| 4,950,424 | 8/1990 | Van Der Hoeven et al. | 252/540 |
| 4,983,316 | 1/1991 | Starch | 252/174.15 |
| 4,983,326 | 1/1991 | Vandersall | 252/603 |
| 4,990,178 | 2/1991 | Haneishi et al. | 71/113 |
| 5,028,263 | 7/1991 | Burdick | 106/194 |
| 5,032,927 | 7/1991 | Mikio et al. | |
| 5,058,096 | 10/1991 | Tadao et al. | |
| 5,079,370 | 1/1992 | D'Silva et al. | 548/365 |
| 5,082,591 | 1/1992 | Marchetto et al. | 252/351 |
| 5,179,096 | 1/1993 | Gentilini et al. | 514/253 |
| 5,223,524 | 6/1993 | Valcke | 514/383 |
| 5,362,312 | 11/1994 | Skaggs et al. | 106/189 |
| 5,465,120 | 11/1995 | Schultheiss | |
| 5,468,418 | 11/1995 | Rabone | 252/174.25 |
| 5,517,321 | 5/1996 | Takamichi | |
| 6,011,897 * | 1/2000 | Koyama et al. | 386/95 |

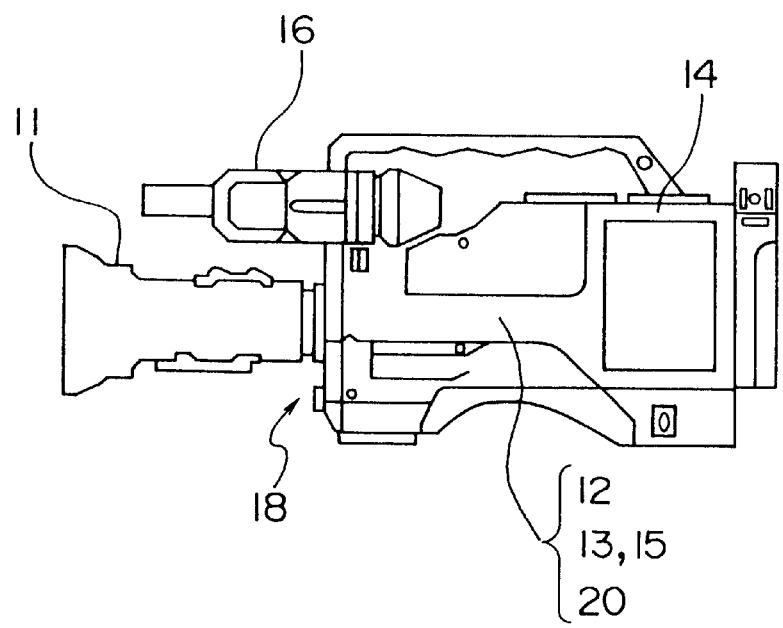
F I G. 1A
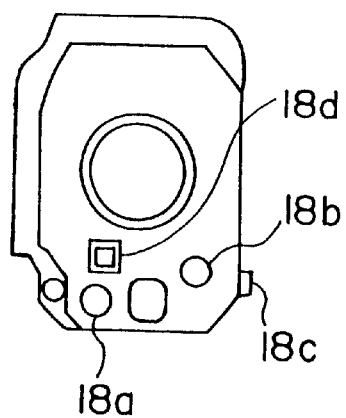
F I G. 1B

TCG 12:34:56:16

15-10

| DISPLAY | REMAINING TAPE |
|---|---|
| F30 | MORE THAN 30 MINUTES |
| 30-25 | 30~25 MINUTES |
| 25-20 | 25~20 MINUTES |
| 20-15 | 20~15 MINUTES |
| 15-10 | 15~10 MINUTES |
| 10-5 | 10~5 MINUTES |
| 5-0 | 5~2 MINUTES |
| 5-0(BLINK) | 2~0 MINUTES |

DISK RECORDING APPARATUS AND VIDEO CAMERA USING THE SAME

BACKGROUND OF THE INVENTION

1. Field of the Invention

The present invention relates to a disk recording apparatus and a video camera using the same. More particularly, the invention relates to a disk recording apparatus and video camera which are designed to record signals, e.g., image signals, and management information pertinent to the recorded signals on a disk-type recording medium in such a manner that, if the storage space of the recording disk runs out during the recording operation, a record area with its content deemed unwanted and voidable is detected based on the accompanying management information and the detected area is used to overwrite the successive signal, thereby extending the available record time.

2. Description of the Related Art

A conventional video camera using a recording tape has the ability of displaying the time of recording (1) and the remaining tape storage space (2) within the view finder as shown in FIG. 7A. Since the remaining tape length on the reel cannot be detected accurately, the remaining tape storage space is given in terms of the approximate remaining record time as shown in FIG. 7B. Specifically, display "F30" signifies that the tape remains for recording 30 minutes or more, and display "30-25" signifies that the tape remains for recording 25 to 30 minutes. This video camera is devised to alarm the user of the run-out of tape in 2 minutes or less by the blinking display "5-0".

The video camera user is obliged to be ready to terminate the shooting by watching the display of remaining tape and the blinking display of tape-end alarm. However, if the tape-end alarm blinks during the shooting of a climax scene, the user must unfortunately halt the shooting and set a new tape cartridge or rewind the recorded tape with the intention of overwriting in case a new tape is not at hand.

SUMMARY OF THE INVENTION

The present invention provides a disk recording apparatus and a video camera using the same with the intention of allowing the user to extend the available record time easily.

The inventive disk recording apparatus is designed such that if the disk storage space runs out during the recording operation, it searches for a record area with its content deemed unwanted and voidable based on the accompanying management information recorded on the disk and records the successive signal by overwriting in the detected area.

The inventive video camera is designed such that if the disk storage space runs out during the shooting of a scene, it searches for a record area with its content deemed unwanted and voidable based on the accompanying management information recorded on the disk and records the successive image signal by overwriting in the detected area.

More specifically, the inventive recording apparatus and video camera are designed to record signals, e.g., image signals, and management information pertinent to the recorded signals on a disk-type recording medium, and during the recording operation in the record time extension mode specified on the operation panel, if the disk storage space runs out, the largest area or the area nearest to the recording head at the run-out of storage space, among the areas with their contents deemed unwanted and voidable searched based on the accompanying management information, is used to record the successive signal by overwriting.

BRIEF DESCRIPTION OF THE DRAWINGS

FIGS. 1A and 1B are external views of the video camera based on this invention;

DETAILED DESCRIPTION OF THE PREFERRED EMBODIMENT

An embodiment of the present invention will be explained in detail with reference to the drawings. FIGS. 1A and 1B show the side view and front view of a video camera based on an embodiment of invention, and FIG. 2 shows its internal arrangement.

Figure 2:
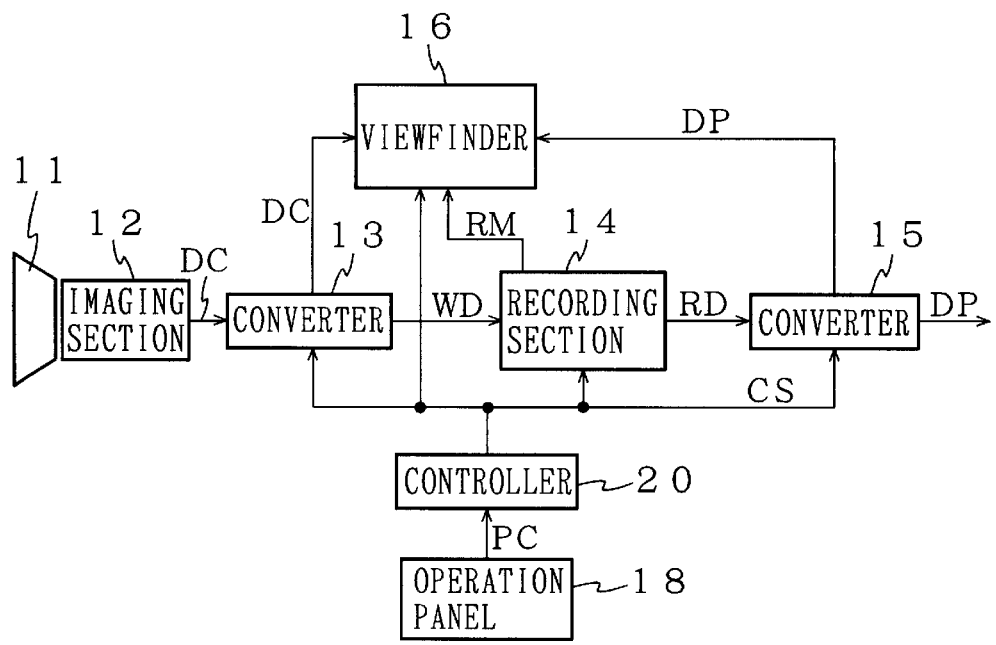
FIG. 2 is a block diagram showing the internal arrangement of the video camera.

In FIGS. 1A and 2, the video camera has a lens section 11, which focuses the image of a subject on the imaging plane of an imaging section 12. The imaging section 12 produces an electrical signal from the image, and further produces a image signal DC from the electrical signal.

The image signal DC is fed to a signal converter 13, which implements the coding process for the image signal DC to produce a record signal WD, and it is fed to a recording section 14. The image signal DC is also sent to a viewfinder 16.

The recording section 14 uses a disk-type recording medium of the MO or phase modulation type optical disk which can be overwritten, and the record signal WD produced by the signal converter 13 is recorded on it.

When the video camera is operated in reproducing mode, the recording section 14 reproduces a record signal on the recording disk to produce a reproduced signal RD, and it is fed to another signal converter 15. The recording section 14 further produces an information signal RM indicative of the remaining record time of the recording disk, and it is sent to the viewfinder 16.

The signal converter 15 renders the multiplexing for the reproduced signal RD to produce a reproduced video signal DP, and it is sent to the viewfinder 16.

The video camera has an operation panel 18, and an operation signal PC produced in response to the user's operation on the panel is sent to a controller 20. The controller 20 produces a control signal CS from the operation signal PC, and sends the signal CS to the signal converter 13, recording section 14, signal converter 15, and viewfinder 16, thereby controlling these sections.

In FIG. 1B showing the front view of the video camera (lens section 11 and viewfinder 16 are not shown), the operation panel 18 includes REC key 18a, TAKE key 18b, NG key 18c, and CONTINUE key 18d. The REC key 18a is pressed to start or halt the recording of the image signal DC.

The TAKE key 18b is pressed to record information at In-point and Out-point, which are moments of operation of the key, so that the user can recognize each scene at the later editing task. The NG key 18c is pressed to record information indicative of the shot scene to be a NG scene, i.e., a faulty shot or redundant shot, so that the user can easily avoid such an unwanted scene at the later editing task.

The information of In-point, Out-point, NG scene, and time of shooting is stored temporarily in memory means, and it is recorded in the management information area on the innermost track of the recording disk after the recording operation is brought to the standby state or the recording operation is terminated. Alternatively, the information of In-point, Out-point and NG scene maybe recorded in an IC memory which is attached on the cartridge of the recording disk.

Figure 3:
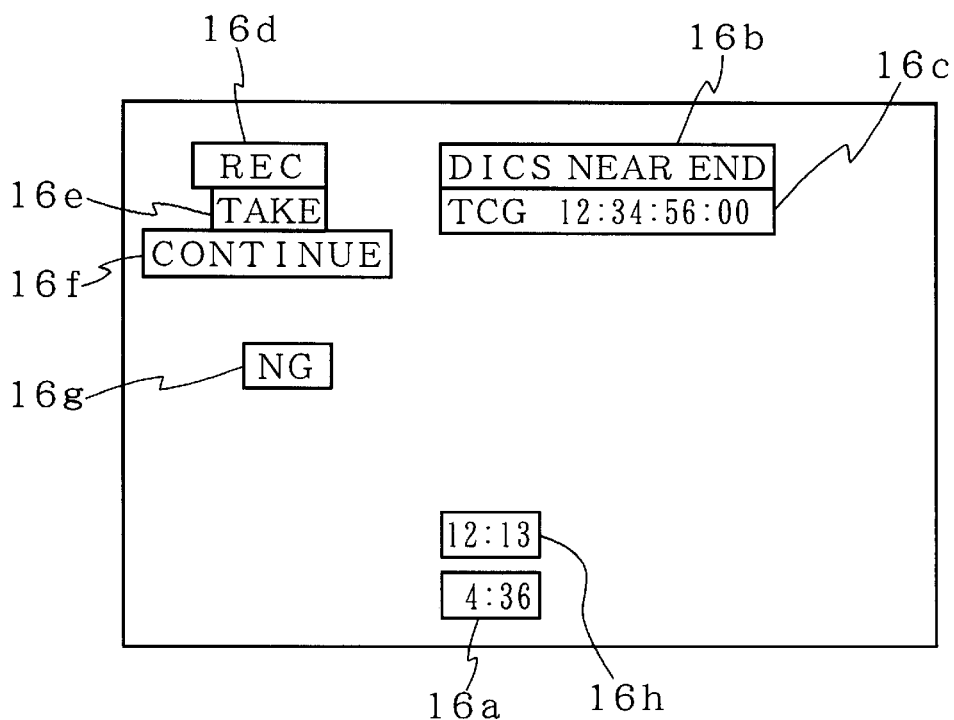
FIG. 3 is a diagram showing a display in the view finder of the video camera.

The viewfinder 16 can display a picture derived from the image signal DC or reproduced video signal DP, and it further displays the remaining record time label 16a, disk near-end alarm label 16b, recording time/time code label 16c, and operating condition labels 16d–16g, as shown in FIG. 3, based on the control signal CS and information signal RM.

The adoption of a disk-type recording medium enables the accurate evaluation of the total storage capacity in terms of the record time and expended record time, and accordingly it is possible to evaluate the remaining record time accurately in the order of seconds by subtracting the expended record time from the total record time. When the remaining record time decreases down to 5 minutes for example, with the label 16a of "5:00" being displayed, this displayed label blinks on each expiration of one second in addition to the display of disk near-end alarm 16b so that the user can easily notice that the run-out of record time is imminent.

When the REC key 18a is pressed and the recording of the image signal DC is started, the recording operation label 16d is displayed. During the period after the TAKE key 18b is pressed to set In-point until the key is pressed again to set Out-point, the TAKE label 16e is displayed. When the NG key 18c is pressed to mark the shot scene to be voidable, the NG label 16g is displayed.

Figure 4:
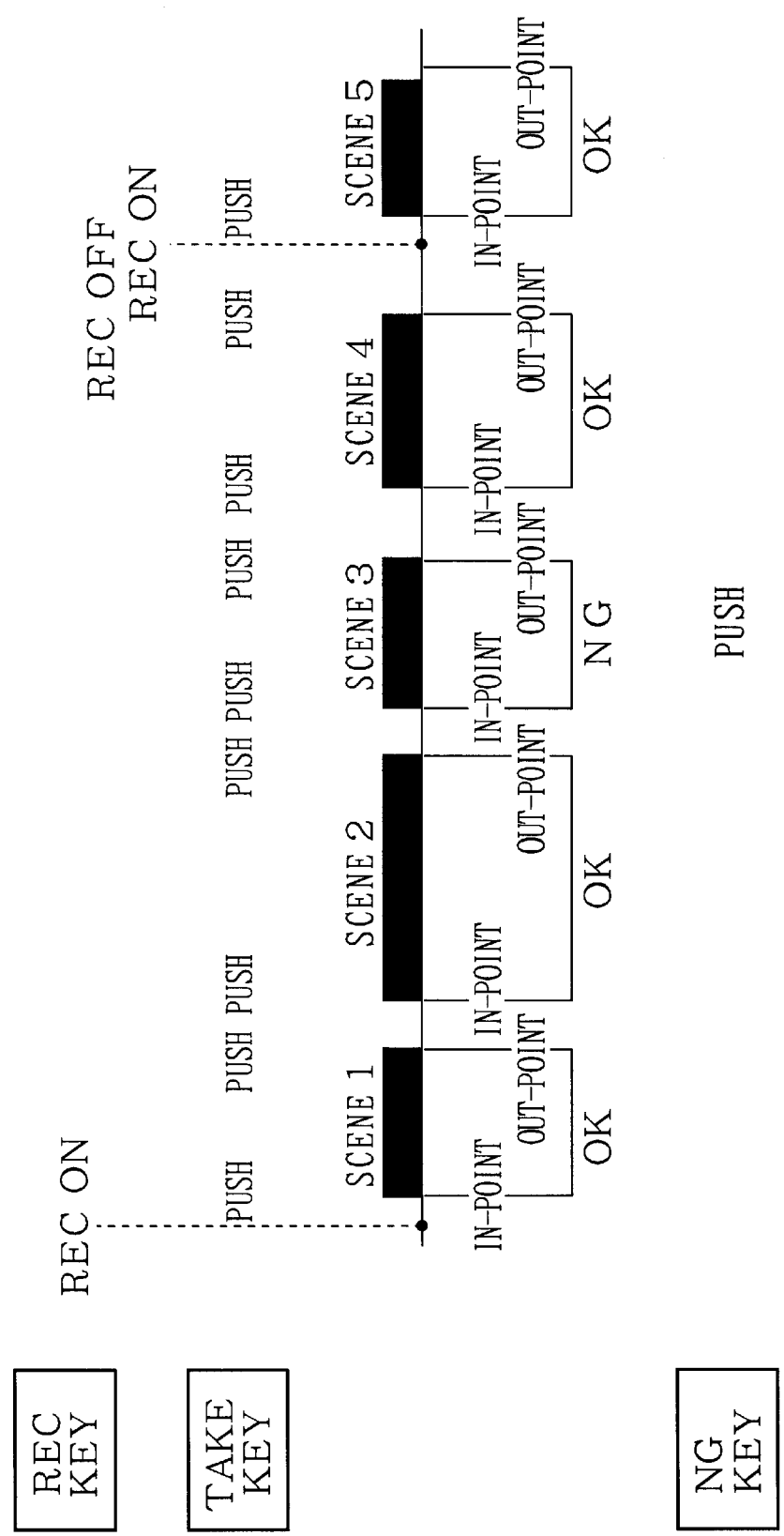
FIG. 4 is a diagram showing the signal recording operation of the video camera.
Figure 5:
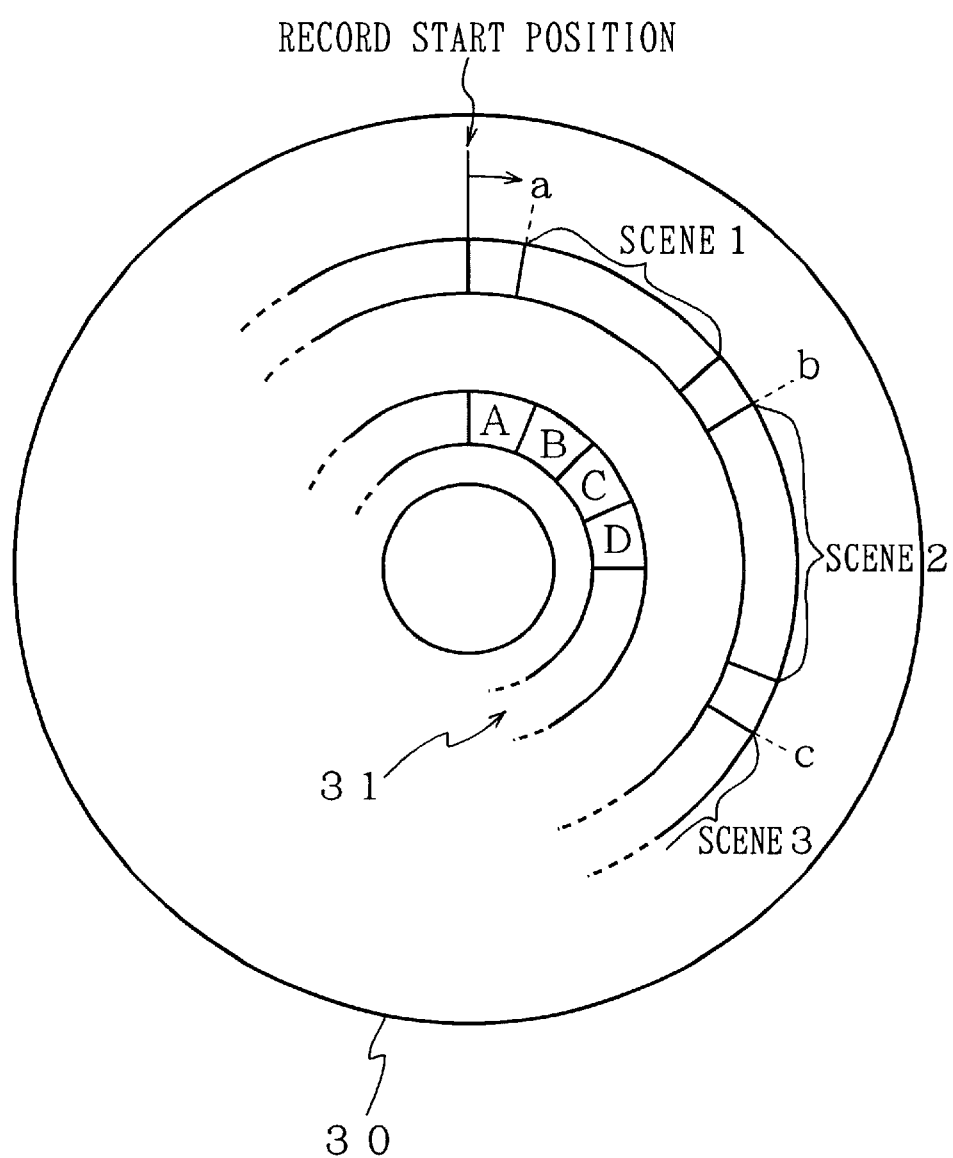
FIG. 5 is a diagram showing the disk recording medium used by the video camera.

In a series of operations shown in FIG. 4, when the REC key 18a is pressed, the video camera begins to record the image signal on a track of the recording disk 30 shown in FIG. 5. During the recording operation, when the TAKE key 18b is pressed, the In-point information and Out-point information are generated so that the user can recognize scene 1, scene 2, scene 3, and so on. If the user presses the NG key 18c following the shooting of the scene 3, information indicative of voidableness is generated for it. The In-point and Out-point information and voidance approval information are stored temporarily in the memory. After that, when the REC key 18a is pressed to bring the operation to the standby state or when the recording operation is terminated, information "A" of the In-point and Out-point for the scene 1, information "B" of the In-point and Out-point for the scene 2, information "C" of the In-point and Out-point for the scene 3 and of voidable scene, and so on are read out of the memory and recorded in the management information area 31 on the innermost track of the recording disk 30.

The user can known from the information "A" recorded in the management information area 31 that the image signal of the intended scene 1 is recorded from starting address a, known from the information "B" that the image signal of the scene 2 is recorded from starting address b, and known from the information "C" that the image signal of the voidable scene 3 is recorded from starting address c.

Occasionally, the user will want to shoot a scene continuously beyond the expected remaining record time even in the presence of a blinking display of remaining record time label 16a and a display of near-end alarm label 16b in the viewfinder 16. In this case, the user presses the CONTINUE key 18d to extend the available record time. When the CONTINUE key 18d is pressed, the CONTINUE label 16f indicative of record time extension and another label 16h of the extended remaining record time as a result of a record time extension process are displayed as shown in FIG. 3. Consequently, the user can be notified of the extended time length for shooting by the extended remaining record time label 16h.

Figure 6:
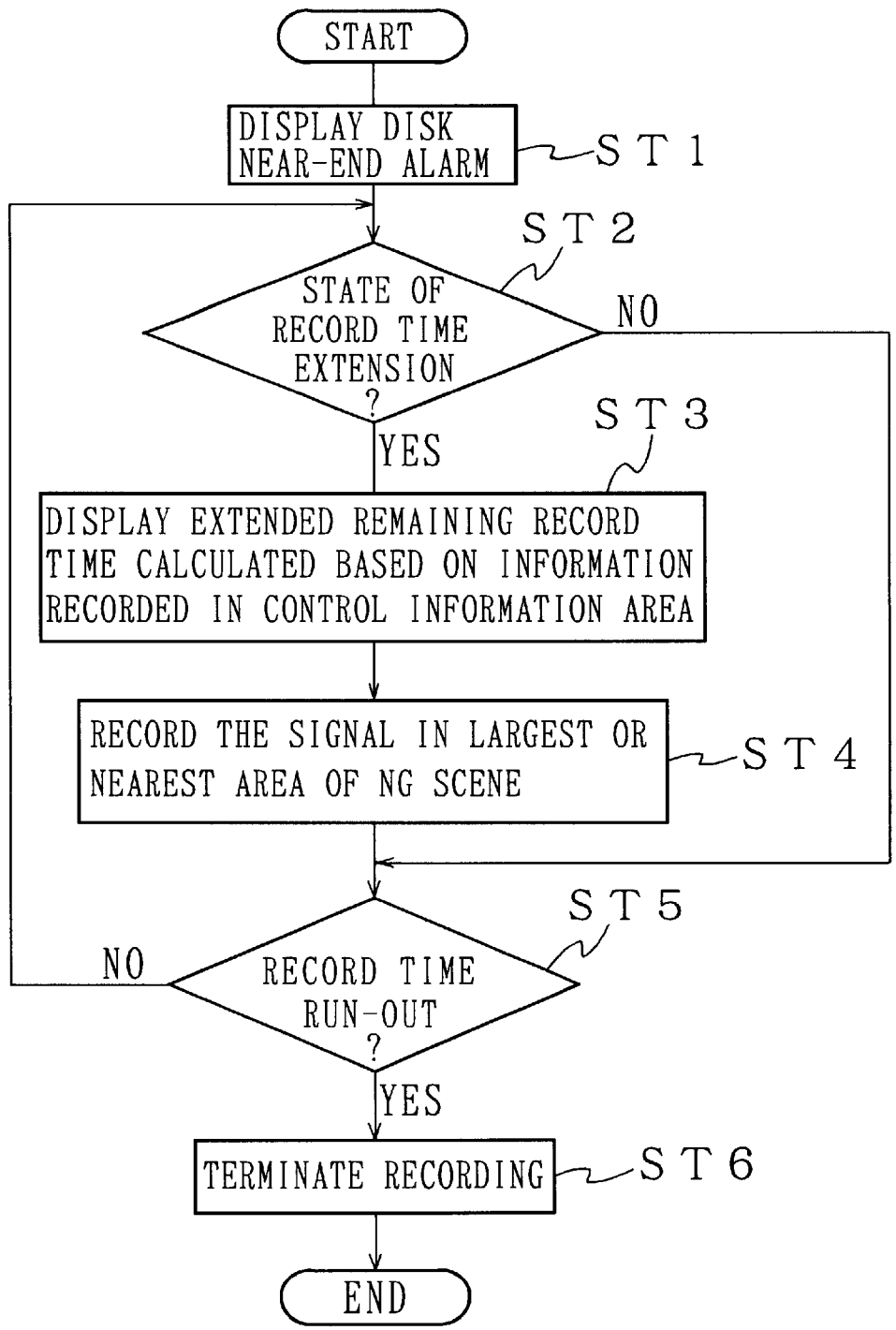
FIG. 6 is a flowchart showing the record time extension process of the video camera.
Figures 7A, 7B:
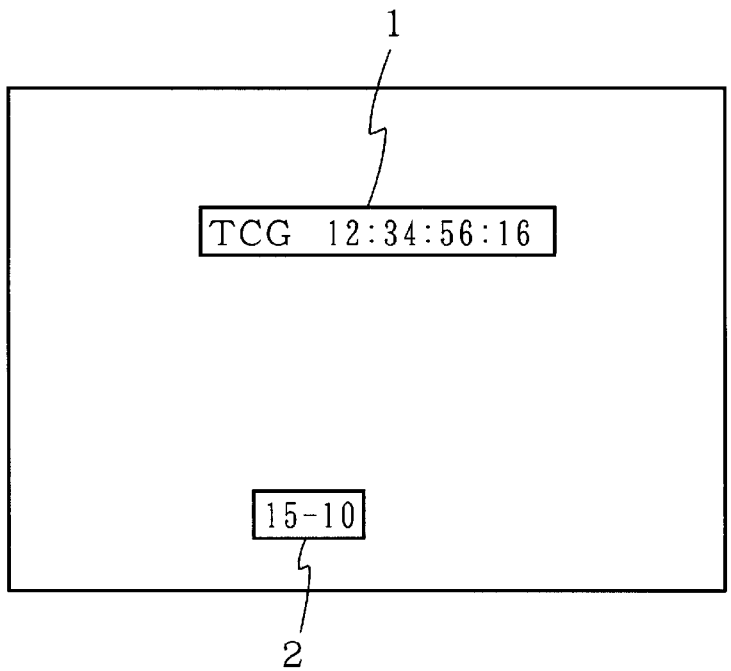
FIGS. 7A and 7B are diagrams showing a display in the viewfinder of the conventional video camera.

Next, the record time extension process which is implemented by the controller 20 will be explained in connection with the flowchart of FIG. 6.

The controller 20 commences the process, and when the remaining record time decreases below 5 minutes, for example, step ST1 causes the display of remaining record time label 16a to blink on each expiration of one second and displays the disk near-end alarm label 16b in the viewfinder 16.

Step ST2 detects as to whether or not the CONTINUE key 18d is pressed by the user for record time extension. The control sequence proceeds to step ST3 in response to the operation of the CONTINUE key 18d, or otherwise proceeds to step ST5.

Step ST3 displays the CONTINUE label 16f in the viewfinder 16. This label is displayed in the form of blink, changed color, monochrome inversion, shading, or a combination thereof, so that the user can easily confirm the record time extension in effect.

The recording disk is searched for areas where image signals of NG scenes are recorded based on the information recorded in the management information area, and record times of these NG scenes are summed. The summed record time of NG scenes is added to the remaining record time to evaluate the extended remaining record time, and it is displayed as the extended remaining record time label 16h. The control sequence proceeds to step ST4.

During the shooting of a scene, if the record time runs out, the controller 20 moves the recording head from the position of image signal of the current scene to an area of image signal of an NG scene based on the information recorded in the management information area. The image signal of the current scene is recorded continuously by overwriting in the NG scene area.

In this case, the controller 20 moves the recording head to the area of the longest NG scene so as to provide the longest extended record time in one NG scene area, or alternatively moves the recording head to the nearest NG scene area so that it uses the smallest space of the buffer memory which holds the image signal temporarily at the transition of head position.

Displaying both the remaining record time label 16a and extended remaining record time label 16h allows the user to recognize easily the expected record time extension and also the timing of switching to a NG scene area after the remaining record time will run out. The user can stop the blinking of the remaining record time label 16a so as to read the displayed value easily and remove the redundant sign. As an alternative design, the remaining record time label 16a and extended remaining record time label 16h are displayed selectively by being switched, in which case the user can watch more easily the viewfinder having fewer displayed items.

The next step ST5 examines the value of remaining record time. If the remaining record time is still non-zero, the control sequence returns to step ST2 for the detection of record time extension mode. Otherwise, if the remaining record time becomes zero, the control sequence proceeds to step ST6 to terminate the recording of image signal.

In case a new image signal is recorded by overwriting on the image signal of a NG scene, information of NG scene overwritten and recorded is held in the memory together with the record position pertinent to the recorded scene and recorded in the management information area on the innermost track of the recording disk on completion of recording or at the halt of recording (standby state). In case overwriting of an image signal has completed in the area of the longest NG scene or in the nearest area, a successive image signal may be recorded by overwriting in the area of the next-longest NG scene or in the area of a NG scene nearest to the overwritten area.

Alternatively, in case image signals are normally recorded outward from the innermost track on the recording disk and the CONTINUE key 18d is pressed to extend the record time, if the recording position for an image signal reaches the end of the outermost track, the recording head is moved to the innermost area of NG scene so that the image signal is recorded continuously by overwriting in that area and successive image signals are recorded by overwriting in areas of NG scenes sequentially in the outward order unless the user terminates the recording operation.

According to this embodiment, as described above, the user presses the CONTINUE key 18d during the shooting in expectation of the run-out of record time, and when the value of remaining record time of the recording disk other than the record position of NG scene becomes zero, the image signal is recorded continuously in the manner of record time extension by overwriting in an area of voidable record, e.g., the largest area of voidable record or the area of voidable record nearest to the current recording position. Based on the management information, which is recorded in the management information area, of the image signal which has been recorded by record time extension, it is possible to access to the extended record section of the image signal instantaneously at editing or reproduce the whole image signal continuously.

Signals recorded on the recording disk are not confined to image signals, but audio signals and other data signals can also be recorded on it obviously.

According to the present invention, when the record time extension is specified on the operation panel during the recording operation for a signal, and when the remaining record time of the recording disk is running out, it is possible for the user to record the signal continuously in the manner of record time extension by overwriting in an area of voidable record, e.g., the largest area of voidable record or the area of voidable record nearest to the current recording position, based on the management information of recorded signals. Based on the recording on the disk of the management information of the signal which has been recorded by record time extension, it is possible for the user to access to the extended record section of the signal instantaneously at editing or reproduce the whole signal continuously.

What is claimed is:

1. A recording apparatus for recording information on a disk-type recording medium comprising:
    means for recording an information signal on said recording medium;
    means for detecting a remaining amount of storage space of said recording medium;
    means for memorizing management information for each set of information signal recorded on said recording medium, said management information including record area information indicative of a record area on said recording medium where a corresponding set of information signal is stored and voidance approval information indicative of whether the corresponding set of information signal is voidable; and
    means for controlling said recording means, in response to said detecting means detecting a depletion of the remaining amount of storage space of said recording medium while said recording means is recording the information signal, to continue recording the information signal in the record area of a voidable set of information signal in accordance with the management information.

2. A recording apparatus according to claim 1, wherein said controlling means controls said recording means, in response to said detecting means detecting a depletion of the remaining amount of storage space of said recording medium while said recording means is recording the information signal, to continue recording the information signal in a largest record area among the record areas of voidable sets of information signal in accordance with the management information.

3. A recording apparatus according to claim 1, wherein said controlling means controls said recording means, in response to said detecting means detecting a depletion of the remaining amount of storage space of said recording medium while said recording means is recording the information signal, to continue recording the information signal in a nearest record area to a current recording position on said recording medium among the record areas of voidable sets of information signal in accordance with the management information.

4. A recording apparatus according to claim 1, further comprising means for instructing said management information memorizing means to memorize the corresponding voidance approval information indicative of whether each set of information signal is voidable as the management information.

5. A recording apparatus according to claim 1, wherein said management information memorizing means stores the management information in a management information record area on said recording medium.

6. A recording apparatus according to claim 1, further comprising:
    means for displaying an indication when the remaining amount of storage space detected by said detecting means is less than a predetermined value; and
    means for setting an operational state of record time extension,
    wherein said controlling means controls said recording means, when the record time extension operational state is set by said setting means and in response to said detection means detecting a depletion of the remaining amount of storage space of said recording medium while said recording means is recording the information signal, to continue recording the information signal in the record area of a voidable set of information signal in accordance with the management information.

7. A recording apparatus according to claim 6, wherein said display means displays a third remaining storage space size which is the sum of a first remaining storage space size detected by said remaining storage space detection means and a second remaining storage space size which is the size of record areas of the set of information signals, with their accompanying voidance approval information indicating the voidableness.

8. A recording apparatus according to claim 1, wherein said information signal comprises a video signal.

9. A video camera comprising:

means for imaging a subject to produce an image signal;

means for recording the image signal as a continuous scene on a disk-type recording medium;

means for detecting a remaining amount of storage space of said recording medium;

means for memorizing management information for each scene recorded on said recording medium, said management information including record area information indicative of a record area for a corresponding scene recorded on said recording medium and voidance approval information indicative of whether the corresponding scene is voidable; and means for controlling said recording means, in response to said detection means detecting a depletion of the remaining amount of storage space of said recording medium while said recording means is recording the image signal, to continue recording the image signal in the record area for a voidable scene in accordance with said management information.

10. A video camera according to claim 9, wherein said controlling means controls said recording means, in response to said detecting means detecting a depletion of the remaining amount of storage space of said recording medium while said recording means is recording the image signal, to continue recording the image signal in a largest record area among the record areas of voidable scenes in accordance with the management information.

11. A video camera according to claim 9, wherein said controlling means controls said recording means, in response to said detecting means detecting a depletion of the remaining amount of storage space of said recording medium while said recording means is recording the image signal, to continue recording the image signal in a nearest record area to a current recording position on said recording medium among the record areas of voidable scenes in accordance with the management information.

12. A video camera according to claim 9, further comprising means for operating on said management information memorizing means to memorize the corresponding voidance approval information indicative of whether each scene recorded on said recording medium is voidable.

13. A video camera according to claim 9, wherein said management information memorizing means stores the management information in a management information record area on said recording medium.

14. A video camera according to claim 9, further comprising:

means for displaying an indication when the remaining amount of storage space detected by said detecting means is less than a predetermined value; and means for setting an operational state of record time extension, wherein said controlling means controls said recording means, when the record time extension state is set by said setting means and in response to said detection means detecting a depletion of the remaining amount of storage space of said recording medium while said recording means is recording the image signal, to continue recording the image signal in the record area of a voidable scene in accordance with the management information.

15. A video camera according to claim 14, wherein said display means displays a third remaining storage space size which is the sum of a first remaining storage space size detected by said remaining storage space detection means and a second remaining storage space size which is the size of record areas of a set of information signal, with their accompanying voidance approval information indicating the voidableness.

16. A video camera according to claim 9, wherein said information signal comprises a video signal.

* * * * *